US009785621B2

(12) United States Patent
Podjarny et al.

(10) Patent No.: US 9,785,621 B2
(45) Date of Patent: Oct. 10, 2017

(54) PROGRESSIVE CONSOLIDATION OF WEB PAGE RESOURCES

(71) Applicant: Akamai Technologies, Inc., Cambridge, MA (US)

(72) Inventors: Guy Podjarny, Ottawa (CA); Christopher R. Dumoulin, Ottawa (CA)

(73) Assignee: Akamai Technologies, Inc., Cambridge, MA (US)

(*) Notice: Subject to any disclaimer, the term of this patent is extended or adjusted under 35 U.S.C. 154(b) by 87 days.

(21) Appl. No.: 14/081,235

(22) Filed: Nov. 15, 2013

(65) Prior Publication Data

US 2014/0149844 A1    May 29, 2014

Related U.S. Application Data

(60) Provisional application No. 61/729,696, filed on Nov. 26, 2012, provisional application No. 61/799,861, filed on Mar. 15, 2013.

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/218* (2013.01); *G06F 17/227* (2013.01); *G06F 17/2229* (2013.01); *G06F 17/2235* (2013.01); *G06F 17/2252* (2013.01); *G06F 17/2264* (2013.01); *G06F 17/24* (2013.01)

(58) Field of Classification Search
CPC .... G06F 17/2247; G06F 17/24; G06F 17/211; G06F 17/2252; G06F 17/218; G06F 17/2229; G06F 17/2235; G06F 17/2264; G06F 17/227
See application file for complete search history.

(56) References Cited

U.S. PATENT DOCUMENTS 6,397,217 B1    5/2002  Melbin
7,047,033 B2    5/2006  Wyler
(Continued)

FOREIGN PATENT DOCUMENTS

EP    0949571    10/1999

OTHER PUBLICATIONS

Steve Halvorson, "How to speed up your website load times", Feb. 21, 2013, Webdesigner Depot, pp. 9.*
(Continued)

*Primary Examiner* — Chau Nguyen

(57) ABSTRACT

Described herein are systems, method and devices for modifying web pages to enhance their performance. In certain non-limiting embodiments, improved resource consolidation techniques are described, which are sometimes referred to herein as 'progressive' consolidation. Such techniques can be used to consolidate page resources in a way that allows a client browser or other application to process each of the consolidated resources after it arrives, even if all the client has not fully retrieved all of the consolidated resources yet. The teachings hereof can be used, for example, to modify a markup language document (HTML) to consolidate CSS, JavaScript, images, or other resources referenced therein.

17 Claims, 5 Drawing Sheets

(51) Int. Cl.
  *G06F 17/24* (2006.01)
  *G06F 17/21* (2006.01)

(56) References Cited

U.S. PATENT DOCUMENTS

| | | | |
|---|---|---|---|
| 7,111,057 | B1 | 9/2006 | Sherman et al. |
| 7,574,486 | B1 | 8/2009 | Cheng et al. |
| 7,886,218 | B2 | 2/2011 | Watson et al. |
| 8,060,581 | B2 | 11/2011 | Day et al. |
| 8,250,457 | B2* | 8/2012 | Fainberg ........... G06F 17/30902 715/205 |
| 8,316,124 | B1* | 11/2012 | Baumback ............. H04L 67/22 709/203 |
| 8,856,263 | B2 | 10/2014 | Fainberg et al. |
| 9,015,348 | B2 | 4/2015 | Hofmann et al. |
| 9,083,566 | B1* | 7/2015 | Pearson .................. H04L 29/00 |
| 2003/0033448 | A1 | 2/2003 | Kieffer |
| 2005/0050000 | A1 | 3/2005 | Kwok et al. |
| 2005/0204276 | A1 | 9/2005 | Hosea et al. |
| 2007/0101061 | A1 | 5/2007 | Baskaran |
| 2007/0136337 | A1* | 6/2007 | Sah ..................... G06F 17/3089 |
| 2007/0136443 | A1 | 6/2007 | Sah et al. |
| 2007/0299857 | A1* | 12/2007 | Gwozdz ........... G06F 17/30899 |
| 2008/0071857 | A1 | 3/2008 | Lie |
| 2008/0098093 | A1 | 4/2008 | Simon |
| 2008/0120434 | A1 | 5/2008 | Alstad |
| 2008/0228920 | A1 | 9/2008 | Souders et al. |
| 2008/0281798 | A1 | 11/2008 | Chatterjee et al. |
| 2008/0306816 | A1 | 12/2008 | Matthys et al. |
| 2009/0217145 | A1* | 8/2009 | Watson ............. G06F 17/30905 715/202 |
| 2009/0254707 | A1 | 10/2009 | Alstad |
| 2009/0276488 | A1* | 11/2009 | Alstad ................... H04L 67/303 709/203 |
| 2010/0050089 | A1 | 2/2010 | Kim et al. |
| 2011/0029899 | A1* | 2/2011 | Fainberg ........... G06F 17/30902 715/760 |
| 2011/0066676 | A1* | 3/2011 | Kleyzit ............. G06F 17/30902 709/203 |
| 2011/0099467 | A1 | 4/2011 | Kapur et al. |
| 2011/0137973 | A1 | 6/2011 | Wei et al. |
| 2011/0231482 | A1* | 9/2011 | Benna ............... G06F 17/30867 709/203 |
| 2011/0314091 | A1 | 12/2011 | Podjarny |
| 2013/0227078 | A1 | 8/2013 | Wei et al. |
| 2014/0053057 | A1* | 2/2014 | Reshadi .............. G06F 17/2247 715/234 |
| 2015/0088968 | A1 | 3/2015 | Wei et al. |
| 2015/0088969 | A1 | 3/2015 | Wei et al. |
| 2015/0088970 | A1 | 3/2015 | Wei et al. |

OTHER PUBLICATIONS

Paul Annesley, "Faster Page Loads—Bundle Your CSS and Javascript", Apr. 10, 2007, Search SitePoint, pp. 13.*

Samuel Santos, "Combine and minimize JavaScript and CSS files for faster loading", May 25, 2009, published by Samaxes, pp. 12.*

"Make your pages load faster by combining and compressing javascript and css files", Dec. 18, 2006, pp. 22.*

Matthew Snider, "Using Ant to Consolidate CSS and JavaScript", Feb. 25, 2009, pp. 3.*

Brooks et al, "Application-Specific Proxy Servers as HTTP Stream Transducers," published at http://www.w3.org/Conferences/WWW4/Papers/56/.

Bickmore, T. et al., Digestor: device-independent access to the World Wide Web, Computer Networks and ISDN Systems, vol. 29, (Sep. 1997), pp. 1075-1082.

Anupam, Joshi et al. "Mowser: Mobile Platforms and Web Browsers" Bulletin of the IEEE Technical Committee on Operating System and Application Environments, vol. 8, No. 1, 1996, 4 pages.

Armando Fox, Steven D. Gribble, Eric A. Brewer, and Elan Amir, Adapting to network and client variability via on-demand dynamic distillation. In Proceedings of the seventh international conference on Architectural support for programming languages and operating systems (ASPLOS-VII). ACM, New York, NY, USA, 1996, pp. 1-11.

Clinton Wong, Web Client Programming with Perl, Chapter 3, Learning HTTP, O'Reilly Online Catalog, 1st edition 1997.

Fox and E. A. Brewer. Reducing WWW Latency and Bandwidth Requirements by Real-time Distillation, Computer Networks and ISDN Systems, vol. 28, (May 1996), pp. 1445-1456.

Liljeberg, Enhanced Services for World Wide Web in Mobile WAN Environment, Univ of Helsinki, Department of Computer Science, Series of Publications C, No. C-1996-28, Apr. 1996, 15 pages.

Zenel, A Proxy Based Filtering Mechanism for the Mobile Environment, Columbia University PhD submission, 1998.

Bharadvaj, Harini et al., "An Active Transcoding Proxy to Support Mobile Web Access," Reliable Distributed Systems, Proceedings of 17th IEEE Symposium on Reliable Distributed Systems, pp. 118-123 (1998).

Bixby, Joshua, "15 things you can (and should) do to make your site faster for mobile users Speed Awareness Month", Speed Awareness Month website, web page posting at http://www.speedawarenessmonth.com/15thingsformakingyoursitefasterformobileusers/, (downloaded Oct. 5, 2015), 9 pages, Dec. 29, 2012.

Lum, A Context Aware Decision Engine for Content Adaptation, Pervasive Computing, Col. 1, Issue 3, IEEE 2002, pp. 41-49.

Mickens, James, "Silo: Exploiting JavaScript and DOM Storage for Faster Page Loads", Microsoft Research paper, at http://research.microsoft.com/pubs/131524/paper.pdf, presented at WebApps '10, Usenix Conference on Web Application Development, Jun. 23-24, 2010 Boston MA according to https://www.usenix.org/legacy/events/webapps10/tech/, (downloaded Sep. 9, 2015), 12 pages.

USENIX, "WebApps '10 Conference Sessions", Web Apps '10 USENIX Conference on Web Application Development, 2010 USENIX Federated Conferences Week Jun. 22-25, 2010, we page at https://www.usenix.org/legacy/events/webapps10/tech/, (downloaded Mar. 14, 2016), 3 pages.

* cited by examiner

PROGRESSIVE CONSOLIDATION OF WEB PAGE RESOURCES

CROSS REFERENCE TO RELATED APPLICATIONS

This application claims the benefit of priority of U.S. Provisional Application No. 61/729,696, filed Nov. 26, 2012, and also claims the benefit of priority of U.S. Provisional Application No. 61/799,861, filed Mar. 15, 2013. The teachings of both of the foregoing applications are hereby incorporated by reference in their entireties.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights.

BACKGROUND

Technical Field

This application relates generally to methods and systems for modifying web pages to enhance their performance.

Brief Description of the Related Art

Web pages are complicated entities, made up of Hyper-Text Markup Language (HTML), as well as other technologies, such as Cascading Style Sheets (CSS), JavaScript, Flash, and many more. Web pages can be thought of as programs executed by a browser or client, which is capable of executing software code in the abovementioned languages and technologies. Though it is generally transparent to end-users, web pages are often generated upon request, created by running dedicated software on a server when a user request is received. Such dedicated software is called a web application, and it typically uses technologies such as J2EE, PHP, ASP.NET and others.

A web page can be thought of as the software code provided or served as a response to a request for a particular and unique URI (universal resource identifier) or web address, or pointer thereto such as HTML, XHTML or different versions thereof. This software code is used by a web client to render or display a page for viewing.

One implication of the complexity of web pages is that there are many ways to achieve the same goal. Two web pages can look the same and function the same way (or at least similarly) for a given client, but their actual underlying content may be very different.

Even when different implementations result in the same or similar interface presented to a user, they may differ greatly in many different aspects. For example, one page may render much faster than the other; one page may expose a security flaw while the other does not; one page can be successfully loaded in multiple different browsers, while the other may only work in one kind of browser, for example.

As is known in the art, performance-enhancing changes (often referred to as performance optimizations) to web pages are sometimes performed by manipulating the web page after it is generated, using a proxy. A proxy may be realized as a software application able to modify incoming and outgoing communication with the web server. A proxy may be implemented in various ways, including the provision of a separate server machine that traffic to a web server goes through, or of a software proxy deployed as a web-server add-on through which internet traffic is passed. A content delivery network (CDN) may employ a distributed set of proxy servers operated and managed by a service provider. The service provider typically provides the content delivery service on behalf of third parties who designate their content to be delivered to end-users via the CDN. Typically, content providers offload their content delivery by aliasing (e.g., by a DNS CNAME) given content provider domains or sub-domains to domains that are managed by the service provider's authoritative domain name service, which directs end user client machines to one of the CDN's proxy servers to obtain the content provider's content more reliably and efficiently.

Making modifications in a proxy is an alternative to modifying the web application that generates the web page, and can provide several benefits, including lower cost and more flexibility.

In the last few years, there have been examples of proxy-based systems that perform not only the transformation, but also attempt to analyze the page and transform it based on that analysis, in order to enhance the performance of that page.

One known performance enhancement technique is sometimes referred to as resource consolidation. Resource consolidation generally involves combining multiple resources in a given web page into one consolidated resource.

For example, the proxy might several cascading style sheet (CSS) files referenced in a given HTML file into one CSS file. If the HTML referenced five external CSS files (e.g., with five separate URIs), combining them into one reference would eliminate four requests when loading the page, and the combined CSS file, when encoded using gzip or other compression, would likely compress more efficiently than compressing the files separately. Hence, a proxy solution may attempt to identify the CSS files in a given page, create a combined file, and modify the HTML to reference that combined CSS file instead. Other kinds of files, such as JavaScript files, can also be consolidated with this technique.

However, when a client browser downloads a consolidated resource, none of that resource is evaluated and processed by the browser until the entire resource has arrived. If the consolidated resource is relatively large, it may take a while until the first portion of it (e.g., the portion corresponding to a first JavaScript file that was consolidated into a larger consolidated file) actually gets processed by the browser. This can make consolidation actually degrade performance, for if the resources had not been consolidated but rather retrieved separately, the browser would have started processing them as they arrived, which in some cases would result in better performance.

Hence, there is a need for improved techniques for consolidating web page resources. The teachings herein address this need and offer other advantages and functionality that will become clear in view of this disclosure.

SUMMARY

This disclosure presents, among other things, techniques for consolidating web resources in a way that allows a client browser to process them progressively—in other words, to begin to execute or process the resource after being received by the client, even if the entire resource is not fully retrieved yet. The techniques disclosed herein are sometimes referred to herein as "progressive consolidation" or "streaming consolidation." They may be implemented in a proxy server, although this is not required.

In one embodiment, resources are consolidated into a container resource. The container is configured to be or of a type known to be progressively processed by a client. This container is then embedded or injected into the parent web page. Thus the container wraps the consolidated data in a way that will cause the client to process each resource inside it as it arrives at the client, yet still provides the benefit of consolidation.

By way of example, consider an HTML document with—among other things—three embedded URIs pointing to three objects or resources, such as three JavaScript files, or three image files. The contents of the three files can be consolidated into one file that is formatted to be progressively processed. The HTML format is progressively processed by browsers, so the three files can be consolidated into a second HTML file, and this second HTML file can be injected into the first HTML file by inserting an embedded reference to the second HTML file using an iFrame (HTML inline frame).

In the example just given, the container resource requires just one request from the server to obtain all of the consolidated content—a request for the second HTML file. However, the client begins processing the consolidated content (e.g., the JavaScript, the image, as the case may be) as it arrives, rather than waiting for the entire contents of the HTML file.

The teachings hereof can be used to consolidate many different kinds of web resources. Typical examples include without limitation CSS files, image files, and JavaScript files, other scripts or code, and other resources capable of being identified in a textual manner within a web page.

The performance optimization techniques described herein may be performed as an automated post-authoring or post-generation treatment applied to web content on a web server before delivery to a requesting client. They may also be performed as a service by an intermediary between the client and origin server that modifies content as it is delivered from the origin server to the client. An example of such an intermediary is an HTTP proxy server that may be part of a distributed data processing platform such as a content delivery network (CDN).

Hence, in one embodiment, an HTTP proxy server receives a request for a given HTML file from a client. The proxy retrieves the HTML file from an origin server (e.g., the origin server of the content provider who is using the CDN for delivery), modifies the HTML file by applying progressive consolidation of web resources in accordance with the teachings hereof, and delivers the modified HTML file to the client that requested it.

The foregoing merely refers to embodiments of the subject matter disclosed herein, which are not limiting. The teachings hereof may be realized in a variety of systems, methods, apparatus, and non-transitory computer-readable media. It is also noted that the allocation of functions to different machines is not limiting, as the functions recited herein may be combined or split amongst different machines in a variety of ways.

BRIEF DESCRIPTION OF THE DRAWINGS

The teachings hereof will be more fully understood from the following detailed description taken in conjunction with the accompanying drawings, in which.

DETAILED DESCRIPTION

Figure 1:
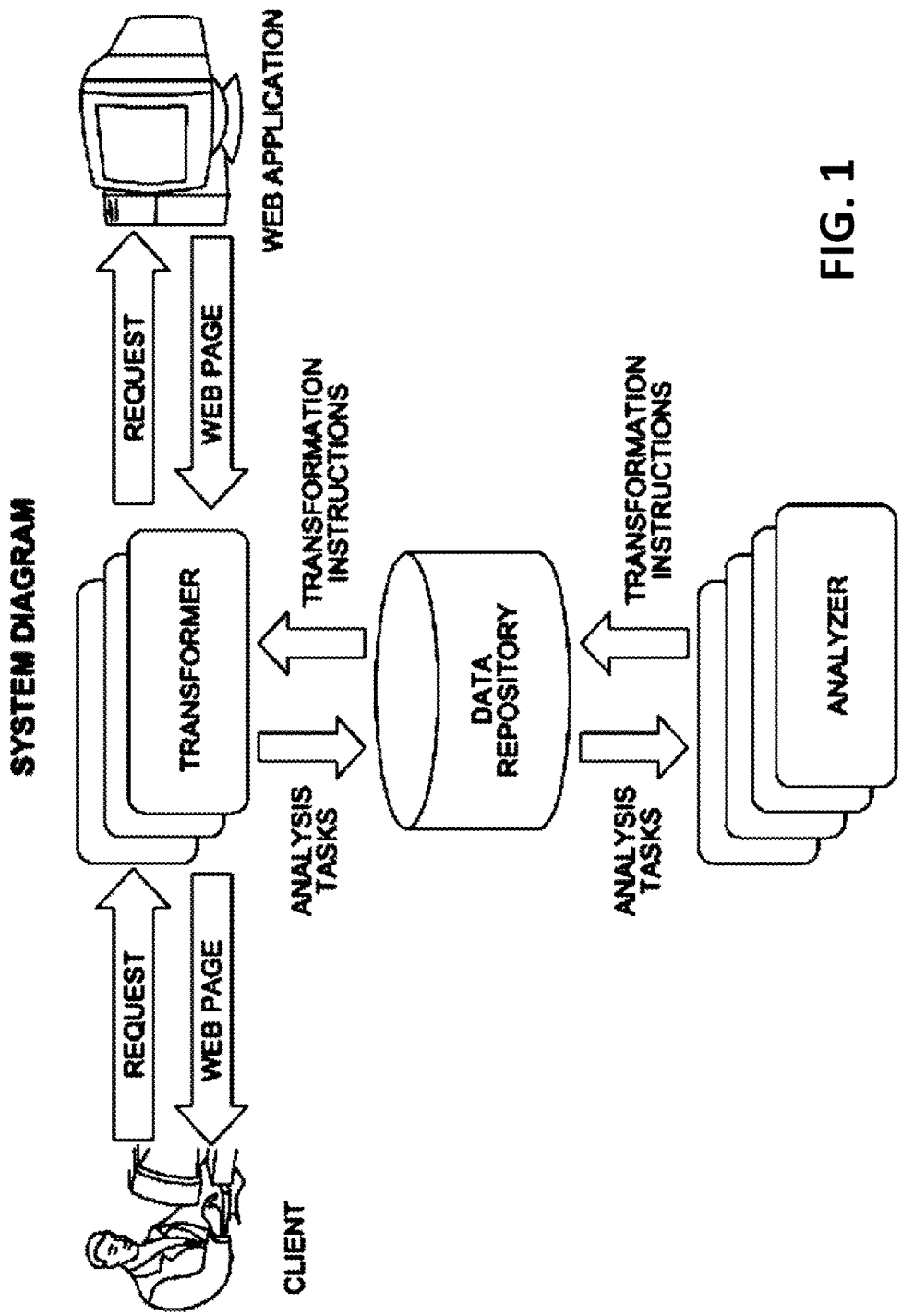
FIG. 1 is a system block diagram illustrating a request for a web page from a client and a response with a web page.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this disclosure, the abbreviation "e.g." is used to denote the non-limiting phrase "for example."

A detailed example of progressive consolidation is now presented. Consider first a scenario in which a web page has no consolidation. As shown below, in this case we have an HTML file that has an inline script (function processScript (data) {eval(data)}) and also references three external JavaScript files: first_script.js, second_script.js, and third_script.js.

---
No Consolidation
---
page.html
<html><body>
<script>
// A function that receives script data and runs it
function processScript(data) { eval(data) }
</script>
<script src="first_script.js"></script>
<script src="second_script.js"></script>
<script src="third_script.js"></script>
</body></html>
first_script.js
processScript("console.log(1)");
second_script.js
processScript("// A large script, which takes 1 second to download");
third_script.js
processScript("console.log(2)");

---

With no consolidation, there is no performance enhancement, as the three scripts result in three separate requests from a client (and corresponding delays due to round-trip times between client and server, etc., in order to make those requests). Using consolidation, however, the three script files can be combined into a single consolidated JavaScript file, as shown below:

---
Consolidation (Non-Progressive)
---
page.html
<html><body>
<script>
// A function that receives script data and runs it
function processScript(data) { eval(data); }
</script>
<script src="consolidated.js"></script>
</body></html>

| Consolidation (Non-Progressive) |
|---|
| consolidated.js:<br>processScript("console.log(1)");<br>processScript("// A large script, which takes 1 second to download");<br>processScript("console.log(2)"); |

Since the three scripts have been consolidated, there is some performance enhancement, as the browser needs to make only one request to the server to get the content of all three scripts. However, the first script, which logs "1" to the console, will be executed by the browser only after the entire "consolidated.js" file is downloaded, which means it will be delayed by about one second: the time to download the second script (the "large script" listed second in 'consolidated.js') plus some smaller amount of time to download the third script (which logs "2" to the console).

By applying progressive consolidation, this one-second delay can be mitigated. Below is an example of what this can look like using progressive consolidation, replacing consolidated.js with an HTML file in an iFrame.

| Progressive Consolidation |
|---|
| page.html<br><html><body><br><script><br>// A function that receives script data and runs it<br>function processScript(data) { eval(data); }<br></script><br><!-- A hidden iFrame calling the HTML consolidation file--><br><iframe src="consolidated.html" style="display:none"></iframe><br></body></html><br>consolidated.html:<br><html><body><br><script>parent.processScript("console.log(1)");</script><br><script>parent.processScript("//A large script, which takes 1 second to download");</script><br><script>parent.processScript("console.log(2)");</script><br></body></html> |

With progressive consolidation, the browser makes only one request for "consolidated.html" to obtain the content of all three scripts. In addition, the execution of the first script will not be delayed by the time needed to download the other scripts, and so the logging of "1" to the console will happen about one second earlier than in the previous case using non-progressive consolidation.

In the example above, a script—and more particularly a JavaScript call named processScript—is used to communicate the consolidated script data from the iFrame to the parent frame's context (i.e., which is defined by page.html). This approach, however, will not work if the parent document (the page.html) is from a different domain than the consolidated resource (the consolidated.html in the above example), because of JavaScript's 'same origin' policy.

To address that issue, however, a variety of known cross-domain communication techniques can be used to communicate data between frames from different domains, and thus take advantage of the progressive consolidation techniques described herein. For example, a "postMessage" JavaScript call can be used to send data from the iFrame, along with an onmessage event handler in the parent HTML page to receive the data.

As previously mentioned, progressive consolidation can be used to accelerate other kinds of files in a like manner. For example, if the three files in the above example had been CSS files, after progressive consolidation the client browser would begin processing and applying the first CSS file content without waiting for the other CSS to download. Similarly, if the three files in the above example had been image files, after progressive consolidation the browser would begin processing and displaying the first image without waiting for the other images to download.

It should be noted that the progressive consolidation techniques presented above is also advantageous in that it avoids inlining the consolidated content into the original HTML file (e.g., the page.html file in the example above). Inlining the content can have certain disadvantages in some cases. For example, it can result in delaying the page processing until the JavaScript content is downloaded, and can reduce the cacheability of the page, among other things. Hence, the teachings hereof can be applied to HTML that has content of resources inlined in the HTML, e.g., by modifying the HTML to remove the content of the resources inlined in the HTML, insert it into a container resource of a type (e.g., such as type HTML) in which content from a first resource will be processed by the client without waiting for content from a second resource to be received, and modify the HTML by inserting a reference to the container resource.

Automated Application of Progressive Consolidation to Web Pages

Preferably, progressive consolidation is applied "on-the-fly" to an original page by an intermediary module, device, or system that transforms the page as it is delivered from a web server to the requesting client.

One example of a system suitable for implementing progressive consolidation is presented in US Patent Publication No. 2011/0314091, titled "Method and System for Automated Analysis and Transformation of Web Pages," the contents of which are hereby incorporated by reference. Thus, a computer-implemented method and system for modifying web pages, including dynamic web pages, can be based on automated analysis wherein web pages are transformed based on transformation instructions in nearly real-time, and wherein analysis is performed and transformation instructions based on the analysis are prepared prior to a request for the web page. An exemplary system has two primary components, an analyzer which asynchronously and repeatedly analyzes web pages creating and updating transformation instructions relating to the web pages, and a transformer which can intercept traffic to a web server in response to a request for the web page, receives the returned web pages, and transforms them based on stored transformation instructions.

US Publication No. 2011/0314091 describes a variety of methods and systems that can be extended with the teachings hereof. For example, that publication gives an example in which multiple CSS files in a given page can be consolidated, referred to as "merging CSS files" in the text, see paragraphs 87 through 113 thereof (merging example 'main.css' and 'menu.3.0.2.css' files). According to the teachings of the current disclosure, the functionality described in US Publication No. 2011/0314091 may be extended to apply progressive consolidation in such a case. Hence, instead of replacing multiple CSS files with a "combined.css" file, as described there, the analyzer 300 instead can be configured to combine multiple CSS files into a new container HTML file, store that new container HTML file in the repository 401, and then introduce the new container HTML file into the page by instructing the transformer 200 to replace the original page references to the CSS files (main.css and menu.3.0.2.css) with reference to the new container HTML file, using an iFrame tag. The analyzer 300 will also instruct the transformer 200 to insert certain code (e.g., scripts) into the container HTML. Within the HTML, these scripts will communicate the contents of the CSS files to the parent frame, where other scripts will apply them to the page.

Figure 2:
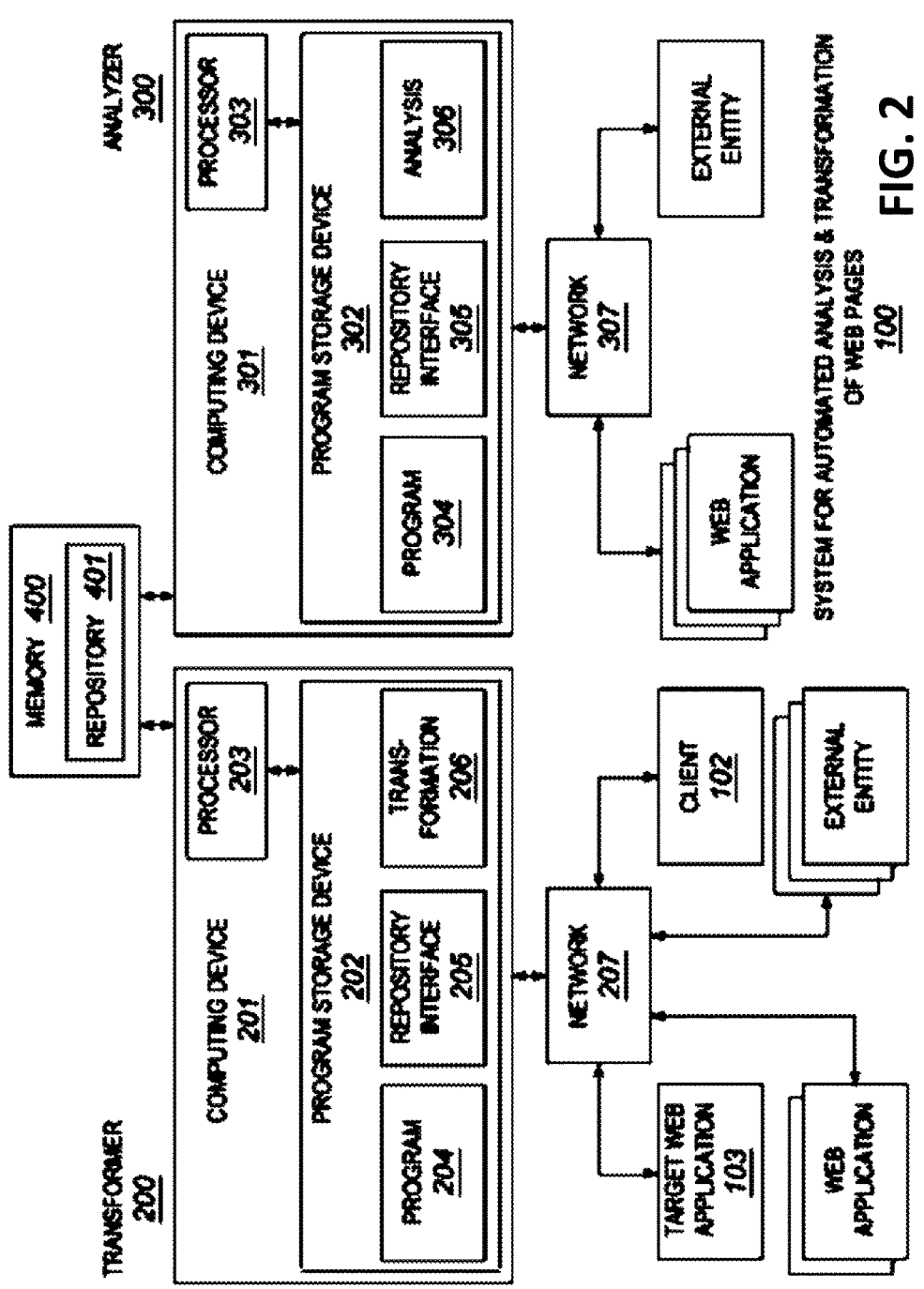
FIG. 2 is a detailed system block diagram illustrating the components of the system illustrated in FIG. 1.

FIGS. 1 and 2 show a system embodiment that is comprised of two primary components: a transformer 200 for performing a transformation and an analyzer 300 for performing the analysis. The system also includes a data repository 401 used by the transformer 200 and analyzer 300 to communicate and store information.

The analyzer 300 does not reside between the client and the server, nor does it watch or interfere with that communication channel, in this embodiment. The analyzer continuously monitors the repository 401, looking for requests to analyze a given page to perform tasks or analysis tasks. When the analyzer receives such a task, it analyzes the web page, and creates transformation instructions. Since the analysis is done asynchronously to the interaction between the client and the server, it does not delay the delivery of the web page to the client, and is not required to work in real-time speed.

Transformation Instructions are often simple instructions, as simple as a textual search and replace instructions. The most important trait of a transformation instruction is that it does not require any deep knowledge or understanding of the page it is transforming. Transformation instructions may be grouped together, if the analysis concluded a set of transformations should either all be applied or not at all.

The Transformer 200 acts as a proxy to the web application. Whenever it receives a web page, it fetches and applies the relevant transformation instructions from the repository 401. If there are no transformation instructions, the transformer 200 requests an analysis task for this web page to the Repository 401.

This system provides both speed and analysis depth. The analysis does not delay the web page, and can therefore "afford" to perform deeper analysis and take more time to do so. The transformer 200 does not need to understand the web page, only to apply the transformation instructions and can therefore do so very quickly. Separating these two functions so that a transformation can be done essentially immediately in response to a request to a web page, and analysis can be done at another time, for example when the page is not being requested, allows the system to provide relatively up-to-date transformations in near-real time.

As shown in FIG. 1, the transformer 200 resides between the client and the web application, and is able to modify the returned web page. The transformer 200 logs requests and pages as needed, to the repository 401. The analyzer(s) 300 reads a page and/or request from the repository, analyzes it, and writes transformation instructions to the repository 401 which will likely be used for a subsequent request of the web page. In response to a request for a web page, the transformer 200 reads the transformation instructions related to the current request/web-page, and applies them to the web page, returning the modified web page to the client.

The transformer 200 and analyzer 300 work independently; therefore there are two sequences presented below, one for each.

The transformer 200 sequence is as follows:
1. Receive a request and the web page returned from the application
2. Query the repository 401 (or a partial copy of the repository's data, such as a local cache) for relevant transformation instructions
   a. If found, transform the web page based on the queried instructions
   b. If none found, enter an analysis task for the request/page to the repository 401
3. The repository 401 returns the web page to the client with any transformations applied.

The analyzer 300 sequence is as follows:
1. Continuously and at regular intervals monitor the repository 401 for new analysis tasks
2. After receiving a task, analyze the web page
3. Create transformation instructions for the page, based on the analysis
4. Write the transformation instructions to the repository 401

As an example of a transformation instruction, consider a search and replace instruction, made up of the original text and replacement text, and a flag indicating if only the first found instance of the original text should be replaced or all instances. One use case for search and replace instructions is merging CSS files. Here is a full flow or sequence for performing such a CSS merge on the web page described below and referred to as "The Page" in this sequence.

Assume that the following 'page.html' contains HTML for The Page, as follows:

```
page.html
<html>
  <head>
    <link rel='stylesheet' type='text/css' href='/main.css'>
    <script> var menuVer = '3.0.2'; document.write( '<link rel="stylesheet" href="/menu.' + menuVer -'.css>');
    </script>
  </head>
  <body>
  <!-- document body here -->
  </body>
</html>
```

Sequence
1. Transformer receives the first request for The Page
   a. Discovers there are no transformation instructions
   b. Creates an analysis task for The Page in the Repository
   c. Returns The Page unmodified (with both CSS files referenced)
2. Analyzer receives the Analysis Task of analyzing The Page
   d. Analyzes the page, discovering both the static and dynamic CSS
   e. Creates a combined file, called "combined.css", holding the content of both "main.css" and "menu.3.0.2.css".
   f. Creates a group of three Search & Replace Transformation Instructions for page.html: two for removing the old CSS references, and one for adding the new one.
      i. Instruction for removing main.css:
         Original: <link rel='styleshee' type='text/css' href='/main.css'>
         Replacement: <empty string>
      ii. Instruction for removing menu.3.0.2.css (using a regular expression):

```
Original: <script>\s*var menuVer='3.0.2';\s*document.write(\s*'<link rel="stylesheet" href="\menu'+menuVer+'.css>');\s*</script>
Replacement: <empty string>
``` iii. Instruction for adding the combined CSS after the head element:

> Original: `<head>`
> Replacement: `<head><link rel='stylesheet' type='text/css' href='/combined.css'>` g. Store as The Page's Transformation Instructions in the Repository

3. Transformer receives another request for The Page h. Queries the DB, receives the group of Transformation Instructions a. i. Searches for the 3 original texts b. i. If all are found, replaces them with the replacement texts ii. If not all are found, does not modify The Page j. Returns the (possibly) modified page In this case, if 3(b)(i) occurred, the returned 'page.html' in step 3 is the following one, with the added link in bold.

```
page.html
<html>
  <head>
    <link rel='stylesheet' type='text/css' href='/combined.css'>
  </head>
  <body>
    <!-- document body here -->
  </body>
</html>
```

Extending the foregoing sequence to progressive consolidation is effected by changing step 2 for the Analyzer as follows (assume the same original 'page.html'):

2. Analyzer receives the Analysis Task of analyzing The Page d. Analyzes The Page, discovering both the static and dynamic CSS e. Creates a combined file, called "combined.css.html", containing the content of both "main.css" and "menu.3.0.2.css", wrapped in the relevant JavaScript call.

An example of the content of combined.css.html:

```
<html>
  <script>parent.processCSS("main.css");</script>
  <script>parent.processCSS("menu.3.0.2.css");</script>
</html>
``` f. Creates a group of Search & Replace Transformation Instructions for page.html: two for removing the old CSS references from page.html, one for adding the new CSS reference to page.html in an iFrame, and one for adding code to page.html to apply the CSS in the iFrame.

i. Instruction for removing main.css:

> Original: `<link rel='stylesheet' type='text/css' href='/main.css'>`
> Replacement: `<empty string>` ii. Instruction for removing menu.3.0.2.css (using a regular expression):

> Original: `<script>\s*var menuVer='3.0.2';\s*document.write(\s*'<link rel="stylesheet" href="'\menu'+menuVer+'.css">');\s*</script>`
> Replacement: `<empty string>` iii. Instruction for adding the combined CSS HTML in an iFrame after the head element:

> Original: `<head>`
> Replacement: `<head><iframe src="combined.css.html" style="display:none">` iv. Instruction for adding code to page.html that will communicate the CSS in the iFrame to The Page and apply it.

```
<script>function processCSS(cssText) {
  var elem = document.createElement('style');
  elem.setAttribute'type','text/css');
  var txt = document.createTextNode(cssText);
  elem.appendChild(txt);
  document.body.appendChild(elem);
}</script>
```

As those skilled in the art will recognize, implementation of 'processCSS' will often include additional code to ensure the CSS text is applied to the page in the right cascading order (i.e., applying the contents of main.css before that of menu.3.0.2.css), as well as various browser specific adjustments. (For JavaScript, ensure it's applied in the right execution order.) Such additions and adjustments may be made in any manner known to those skilled in the art, in view of the teachings hereof g. Store as The Page's Transformation Instructions in the Repository In this case, applying the search & replace instructions above results in following returned 'page.html':

```
page.html
<html>
  <head>
    <iframe src="combined.css.html" style="display:none">
  </head>
  <body>
    <!-- document body here -->
    <script>function processCSS(cssText) {var elem = document.createElement('style'); elem.setAttribute('type','text/css');
var txt =
document.createTextNode(cssText); elem.appendChild(txt);
document.body.appendChild(elem);
    }</script>
  </body>
</html>
```

Note that foregoing implementation assumes that the inserted iFrame and page.html are from the same domain (more specifically, the same hostname). If they are from different domains, then other techniques (e.g., the postMessage technique) described previously can be applied to avoid conflict with the same origin policy.

As those skilled in the art will appreciate, the use case for progressively consolidating JavaScript files, explained earlier, can also be implemented using the system described in US Publication No. 2011/0314091, for example by having the analyzer 300 combine the three scripts into the new container HTML file, store that new container HTML file in the repository 401, and then inject the container file into the page by instructing the transformer to replace the original page references to the .js files (first_script.js, second_script.js, third_script.js) with a reference to the new container HTML file, using an iFrame tag. Further, the analyzer 300 can instruct the transformer 200 to insert or modify code (e.g., scripts) into the container file to communicate the script data up to the parent frame and apply it there, all as previously described.

Further, the system can also be used for the image consolidation use case, for example by having the analyzer 300 convert the images into textual format (for example, using Data URIs), combine the three image files' now textual data (inline) into the new container HTML file, store that new container HTML file in the repository 401, and then inject the container file into the original (parent) page by instructing the transformer 200 to replace original page references to the image files with a reference to the new container HTML file, using an iFrame tag. Further, the analyzer 300 can instruct the transformer 200 to insert or modify code (e.g., scripts) into the container HTML file to communicate the image data up to the parent frame and apply it there, for example by updating the "src" attribute of a placeholder img tag left in the original page to hold the image's data URI.

Automated Application of Progressive Consolidation in a Content Delivery Network (CDN)

As mentioned above, a CDN proxy server may be used to apply the progressive consolidation technique. More specifically, the functions of the transformer, analyzer and repository may be allocated to server machines that are part of such a platform, with the transformer functions taking place in an edge-located proxy server. Hence the transformation function may take place alongside other delivery enhancements and services (caching, routing, protocol optimizations) the platform provides when delivering content to requesting clients on behalf of participating content providers.

Figure 3:
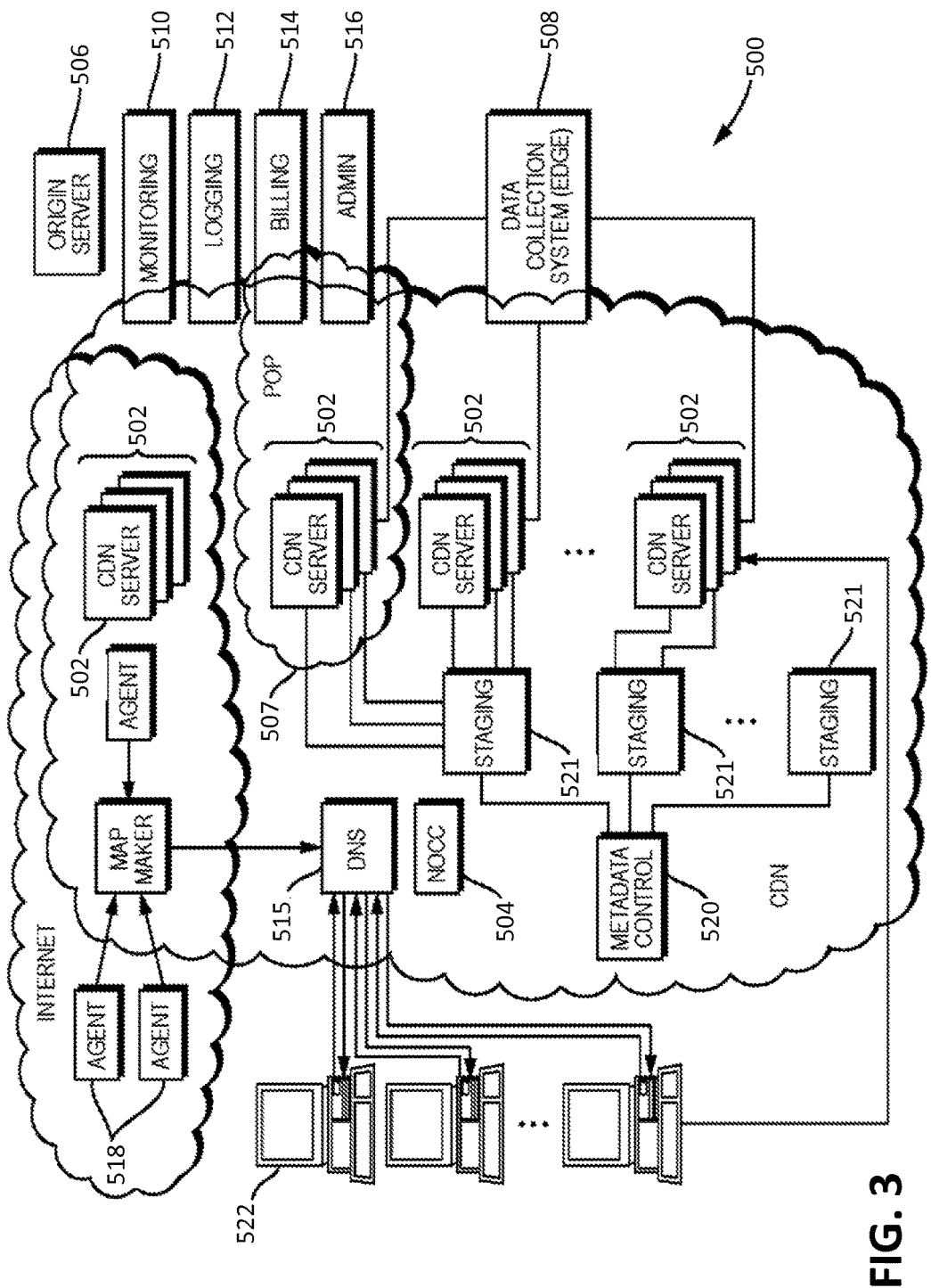
FIG. 3 is a schematic diagram illustrating one embodiment of a distributed computer system configured as a content delivery network (CDN)

FIG. 3, illustrates a known distributed computer system 500 is configured as a content delivery network (CDN) and is assumed to have a set of machines 502 distributed around the Internet. Typically, most of the machines are configured as servers and located near the edge of the Internet, i.e., at or adjacent end user access networks. A network operations command center (NOCC) 504 may be used to administer and manage operations of the various machines in the system. Third party sites affiliated with content providers, such as web site 506, offload delivery of content (e.g., HTML, embedded page objects, streaming media, software downloads, and the like) to the distributed computer system 500 and, in particular, to the CDN servers 502. Such servers may be grouped together into a point of presence (POP) 507.

Typically, content providers offload their content delivery by aliasing (e.g., by a DNS CNAME) given content provider domains or sub-domains to domains that are managed by the service provider's authoritative domain name service. End user client machines 522 that desire such content are directed to the distributed computer system (and more particularly, to one of the CDN servers 502) to obtain that content more reliably and efficiently. The CDN servers 502 respond to the client requests, for example by obtaining requested content from a local cache, from another CDN server 502, from the origin server 506, or other source.

Although not shown in detail in FIG. 3, the distributed computer system may also include other infrastructure, such as a distributed data collection system 508 that collects usage and other data from the content servers, aggregates that data across a region or set of regions, and passes that data to other back-end systems 510, 512, 514 and 516 to facilitate monitoring, logging, alerts, billing, management and other operational and administrative functions. Distributed network agents 518 monitor the network as well as the server loads and provide network, traffic and load data to a DNS query handling mechanism 515, which is authoritative for content domains being managed by the CDN. A distributed data transport mechanism 520 may be used to distribute control information (e.g., metadata to manage content, to facilitate load balancing, and the like) to the CDN servers 502.

Figure 4:
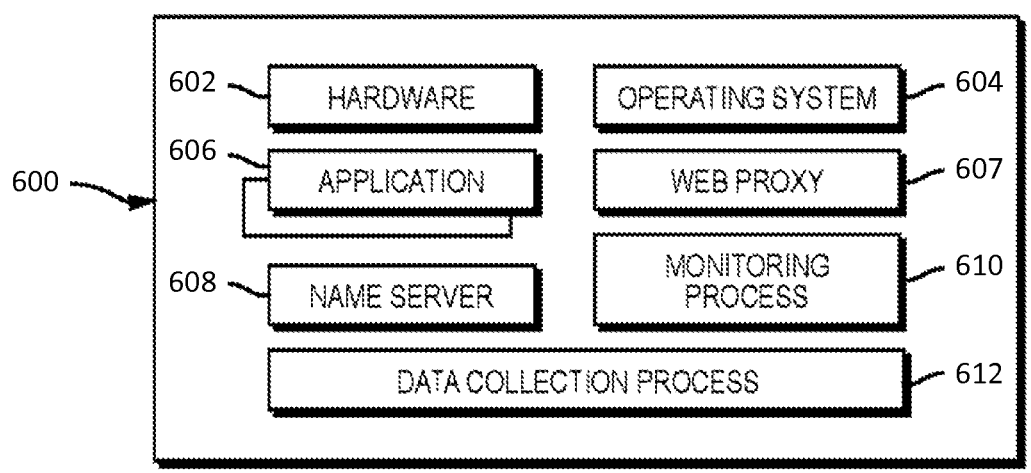
FIG. 4 is a schematic diagram illustrating one embodiment of a machine on which a CDN server shown in the system of FIG. 3 can be implemented.

As illustrated in FIG. 4, a given machine 600 in the CDN (e.g., one of the CDN servers 502) comprises commodity hardware (e.g., an Intel processor) 602 running an operating system kernel (such as Linux or variant) 604 that supports one or more applications (indicated by boxes 606). To facilitate content delivery services, for example, given machines typically run a set of applications, such as an HTTP proxy 607, a name server 608, a local monitoring process 610, a distributed data collection process 612, and the like. The HTTP proxy 607 (sometimes referred to herein as a global host or "ghost") typically includes a manager process for managing a cache and delivery of content from the machine. For streaming media, the machine typically includes one or more media servers, such as a Windows Media Server (WMS) or Flash server, as required by the supported media formats.

The machine shown in FIG. 4 may be configured to provide one or more extended content delivery features, such as the Transformer function described previously with respect to US Publication No. 2011/0314091. In one embodiment, upon receiving a client request, the machine can create the container/consolidated resource, as prescribed previously, and make the necessary modifications to the HTML file.

Other features may be configured on a domain-specific, customer-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,111,057 illustrates a useful infrastructure for delivering and managing CDN server content control information and this and other content server control information (sometimes referred to as "metadata") can be provisioned by the CDN service provider itself, or (via an extranet or the like) the content provider customer who operates the origin server.

Computer-Based Implementation

The clients, servers, and other devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
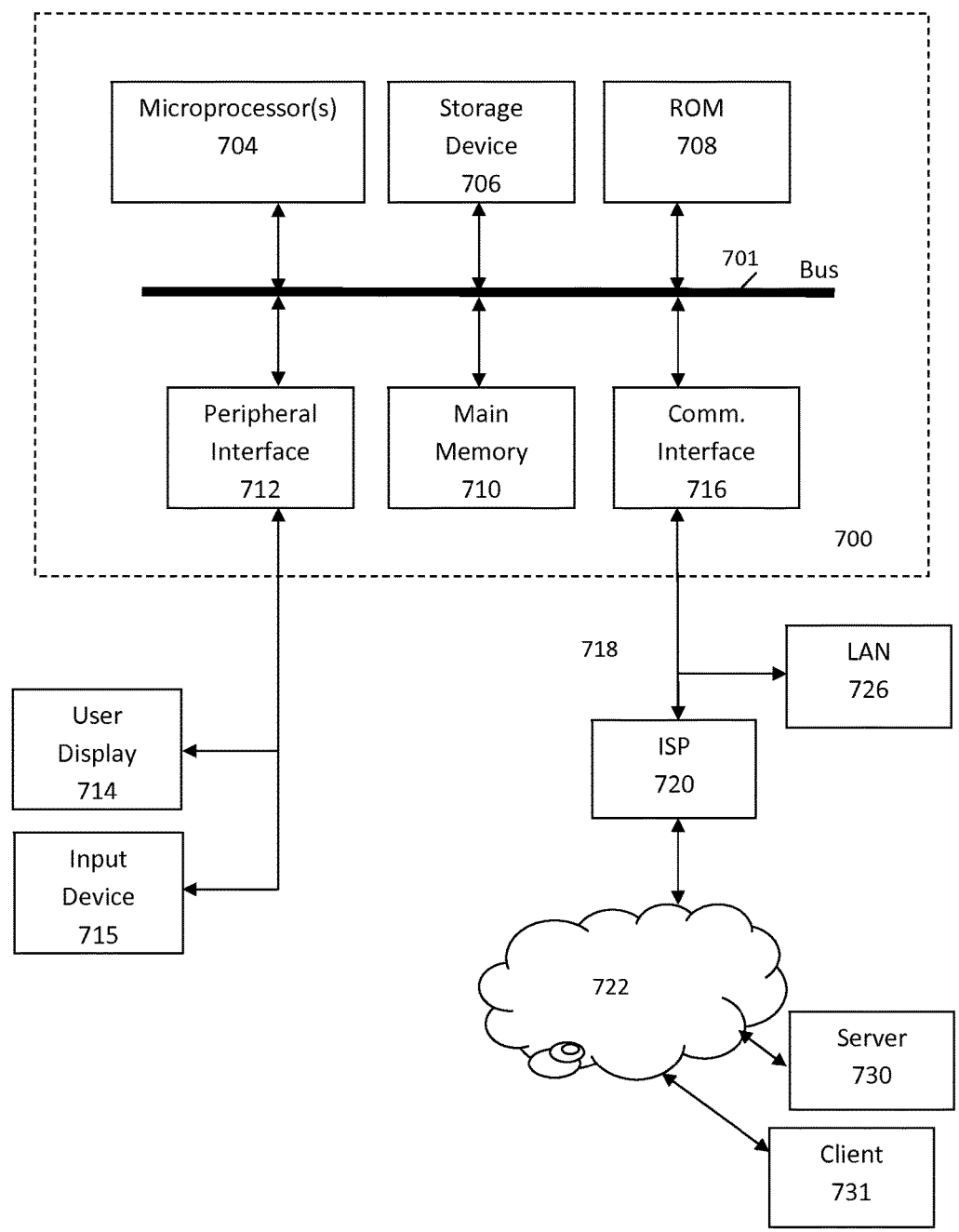
FIG. 5 is a block diagram illustrating hardware in a computer system that may be used to implement the teachings hereof.

FIG. 5 is a block diagram that illustrates hardware in a computer system 700 upon which such software may run in order to implement embodiments of the invention. The computer system 700 may be embodied in a client device, server, personal computer, workstation, tablet computer, wireless device, mobile device, network device, router, hub, gateway, or other device. Representative machines on which the subject matter herein is provided may be Intel Pentium-based computers running a Linux or Linux-variant operating system and one or more applications to carry out the described functionality.

Computer system 700 includes a processor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

Although the computer system 700 is often managed remotely via a communication interface 716, for local administration purposes the system 700 may have a peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry, control and/or level-shifting logic for local buses such as RS-485, Universal Serial Bus (USB), IEEE 1394, or other communication links.

Computer system 700 is coupled to a communication interface 716 that provides a link (e.g., at a physical layer, data link layer, or otherwise) between the system bus 701 and an external communication link. The communication interface 716 provides a network link 718. The communication interface 716 may represent a Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

The invention claimed is:

1. A method implemented by a computer device for modifying web pages before delivery to client web browser, to enhance web page performance, the method comprising:
   receiving HTML associated with a web page;
   modifying the HTML by removing first and second references in the HTML, the first reference being to a first resource and the second reference being to a second resource, the first and second resources each being of a first type that a client processes only after the entire resource is received by the client web browser;
   wherein the first and second resources comprise one of: (i) first and second CSS files of type CSS, (ii) first and second image files of type image, and (iii) first and second scripts of type script;
   inserting content from the first resource and content from second resource into a container resource, wherein the container resource is of a second type in which content from the first resource will be processed by the client web browser to render the web page without waiting for content from the second resource to be received by the client web browser;
   wherein said processing to render the web page without waiting for content from the second resource to be received comprises: (iv) for the first and second resources comprising first and second CSS files, the client web browser applying at least part of the content of the first CSS file to render the web page before the content of the second CSS file finishes downloading to the client web browser; (v) for the first and second resources comprising first and second image files, the client web browser beginning to display the first image file before the second file finishes downloading to the client web browser; (vi) for the first and second resources comprising first and second scripts, the client web browser executing at least part of the first script to render the web page before the second script is finished downloading to the client web browser;
   modifying the HTML by inserting a reference to the container resource into the HTML, so as to have the client web browser process the content from the first resource and the content from the second resource that is in the container resource while processing the HTML; and,
   serve the modified HTML to the client web browser.

2. The method of claim 1, further comprising inserting an iFrame into the HTML, and inserting the reference to the container resource within the iFrame.

3. The method of claim 1, wherein the container resource is a file of type HTML.

4. The method of claim 1, wherein any of the references to the first resource, second resource, and container resource are URIs.

5. The method of claim 1, further comprising inserting code into the HTML, the code being executable at the client web browser to apply the content from the first resource and the content from the second resource when rendering the web page based on the HTML.

6. The method of claim 1, further comprising:
inserting an iFrame into the HTML, and inserting the reference to the container resource within the iFrame;
inserting code into the HTML, the code being executable at the client web browser to apply the content from the first resource and the content from the second resource when rendering the web page based on the HTML; wherein the code is written in JavaScript and the code causes the client web browser to any of: (a) execute the contents of a JavaScript resource in a parent frame-global context of the iFrame and (b) apply style rules from a CSS resource to a parent frame of the iFrame.

7. The method of claim 6, where the code maintains an execution order of the JavaScript resource and a cascading order of the CSS resource.

8. The method of claim 1, where the HTML and the container resource are served from the same hostname.

9. The method of claim 1, where the HTML and container resource are served from different hostnames.

10. The method of claim 9, comprising inserting code into the HTML, the code being executable at the client web browser to apply the content from the first resource and the content from the second resource when rendering the web page based on the HTML, and the code employs a cross-domain communication method.

11. The method of claim 1, further comprising inserting an iFrame tag into the HTML, wherein the reference to the container resource is within the iFrame tag, and the container resource is a file of type HTML.

12. A proxy server machine comprising circuitry forming one or more processors and at least one storage device storing instructions for modifying web pages before delivery to client web browser, to enhance web page performance, the instructions, when executed by the one or more processors, causing the proxy server machine to:
receive a request for HTML from web browser running on a client device, the HTML being associated with a web page;
request the HTML from another server machine;
receive the HTML from the another server machine;
modify the HTML by removing first and second references in the HTML, the first reference being to a first resource and the second reference being to a second resource, the first and second resources each being of a first type that is processed by the web browser only after the entire resource is received by the web browser;
wherein the first and second resources comprise one of: (i) first and second CSS files of type CSS, (ii) first and second image files of type image, and (iii) first and second scripts of type script;
modify the HTML by: inserting a reference to a container resource into the HTML, so as to have the web browser process the content from the first resource and the content from the second resource that is in the container resource while processing the HTML; and,
serve the modified HTML to the web browser;
wherein the container resource comprises content from the first resource and content from second resource, and the container resource is of a second type in which content from the first resource will be processed by the web browser to render the web page without waiting for content from the second resource to be received by the web browser;
wherein said processing to render the web page without waiting for content from the second resource to be received comprises: (iv) for the first and second resources comprising first and second CSS files, the client web browser applying at least part of the content of the first CSS file to render the web page before the second CSS file finishes downloading to the client web browser; (v) for the first and second resources comprising first and second image files, the client web browser beginning to display the first image file before the second file finishes downloading to the client web browser; (vi) for the first and second resources comprising first and second scripts, the client web browser executing at least part of the first script to render the web page before the second script is finished downloading to the client web browser.

13. The machine of claim 12, wherein the another server machine comprises an origin server associated with a content provider.

14. The machine of claim 12, wherein the instructions, when executed by the one or more processors, cause the proxy server to insert an iFrame into the HTML, and insert the reference to the container resource within the iFrame.

15. The machine of claim 12, wherein the container resource is a file of type HTML.

16. The machine of claim 12, wherein the instructions, when executed by the one or more processors, cause the proxy server to insert code into the HTML, the code being executable at the web browser to apply the content from the first resource and the content from the second resource when rendering the web page based on the HTML.

17. The machine of claim 12, where the HTML and container resource are served from different hostnames.

* * * * *